United States Patent
Allehaux et al.

(10) Patent No.: US 8,876,447 B2
(45) Date of Patent: Nov. 4, 2014

(54) TOOL HOLDER COMPRISING A COOLING MEANS

(75) Inventors: Delphine Allehaux, Velaux (FR);
Patrice Rabate, Lahoussoye (FR); Alain Freyermuth, Plaffenhoffen (FR); Jean Bernard Cledat, Pontcharra (FR); Jean-Pierre Fantin, Gouvieux (FR); Ugo Masciantonio, Proville (FR)

(73) Assignees: European Aeronautic Defence & Space Company, Paris (FR); E.P.B., Bouxwiller (FR); Sarl Albret, Pontcharra (FR)

( * ) Notice: Subject to any disclaimer, the term of this patent is extended or adjusted under 35 U.S.C. 154(b) by 844 days.

(21) Appl. No.: 13/055,889

(22) PCT Filed: Jul. 17, 2009

(86) PCT No.: PCT/FR2009/051431
§ 371 (c)(1),
(2), (4) Date: Oct. 27, 2011

(87) PCT Pub. No.: WO2010/012933
PCT Pub. Date: Feb. 4, 2010

(65) Prior Publication Data
US 2012/0070237 A1    Mar. 22, 2012

(30) Foreign Application Priority Data
Jul. 30, 2008  (FR) ...................................... 08 55242

(51) Int. Cl.
*B23Q 11/10*    (2006.01)

(52) U.S. Cl.
CPC ..................................... *B23Q 11/10* (2013.01)
USPC .................. 409/136; 279/20; 408/56; 408/57

(58) Field of Classification Search
USPC ............ 408/56, 60, 61, 57, 59; 409/135, 136;
279/20; 62/5, 259.1–259.3, DIG. 10
See application file for complete search history.

(56) References Cited

U.S. PATENT DOCUMENTS

| | | | |
|---|---|---|---|
| 1,952,281 A | | 3/1934 | Ranque |
| 3,364,800 A | * | 1/1968 | Benjamin et al. .......... 408/239 R |
| 4,669,933 A | * | 6/1987 | Dye ............................. 409/136 |
| 4,795,292 A | * | 1/1989 | Dye ............................. 409/136 |
| 4,919,232 A | * | 4/1990 | Lofton ........................ 184/6.26 |
| 5,358,360 A | * | 10/1994 | Mai .................................. 408/61 |

(Continued)

FOREIGN PATENT DOCUMENTS

| | | |
|---|---|---|
| DE | 3128893 A1 | 2/1983 |
| DE | 29807946 U1 | 9/1998 |

(Continued)

OTHER PUBLICATIONS

International Search Report dated Jan. 27, 2010.

*Primary Examiner* — Daniel Howell
(74) *Attorney, Agent, or Firm* — Perman & Green, LLP

(57) ABSTRACT

A tool holder for a machining tool includes a cooling means for a compressed air blowing tool and a device for cooling air compressed by a vortex tube device. The tool holder is generally cylindrical and the vortex tube device advantageously includes a plurality of vortex tubes placed annularly around the axis of the cylinder and the cold air outputs of which are directed at the tool held by the tool holder.

9 Claims, 5 Drawing Sheets

(56) References Cited

U.S. PATENT DOCUMENTS

| | | |
|---|---|---|
| 6,902,355 B2 * 6/2005 | Kress et al. | 408/59 |
| 7,192,226 B2 * 3/2007 | Unsworth | 409/136 |
| 7,823,487 B2 11/2010 | Steiner | |
| 2005/0169718 A1 * 8/2005 | Beckington | 408/61 |
| 2009/0003951 A1 * 1/2009 | Steiner | 409/136 |
| 2010/0270757 A1 * 10/2010 | Beckington | 279/20 |
| 2011/0229277 A1 * 9/2011 | Hoffer et al. | 407/11 |
| 2012/0141220 A1 * 6/2012 | Chen | 409/136 |
| 2012/0230781 A1 * 9/2012 | Hoffer et al. | 407/11 |

FOREIGN PATENT DOCUMENTS

| | | | | |
|---|---|---|---|---|
| DE | 102004055377 A1 | * | 5/2006 | |
| EP | 1225005 A | | 7/2002 | |
| EP | 1640091 A | | 3/2006 | |
| JP | 2002028806 A | * | 1/2002 | ............ B23B 31/117 |
| JP | 2003200330 A | * | 7/2003 | ............ B23Q 11/00 |
| JP | 2007307651 A | * | 11/2007 | |
| JP | 2009226541 A | * | 10/2009 | |
| WO | 0115840 A | | 3/2001 | |
| WO | 2007101283 A1 | | 9/2007 | |

* cited by examiner

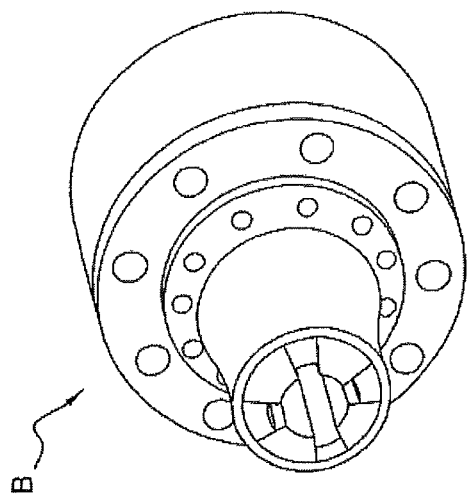
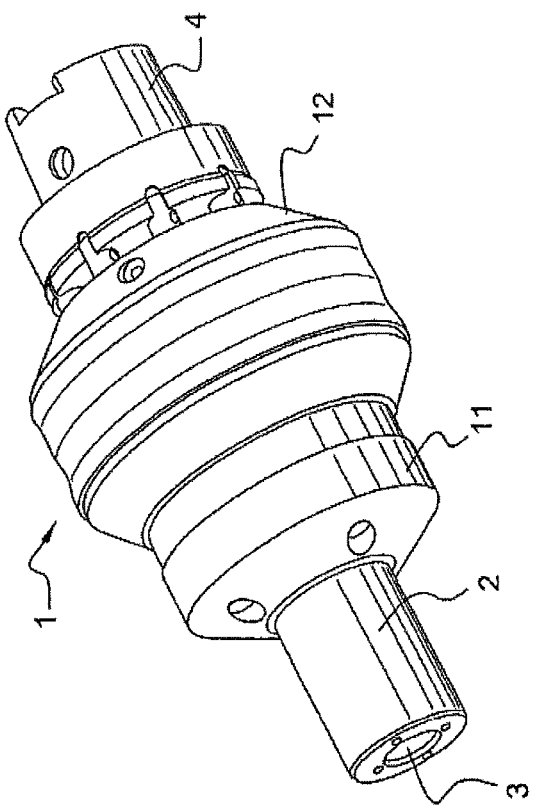
Fig. 1

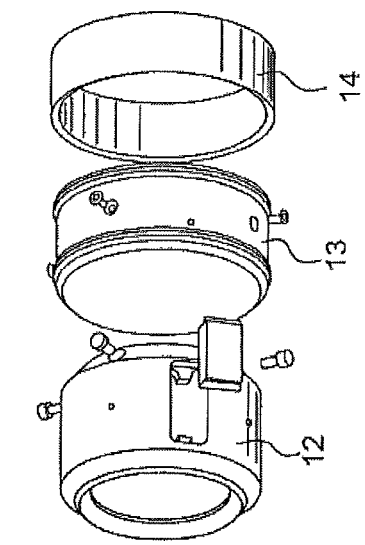
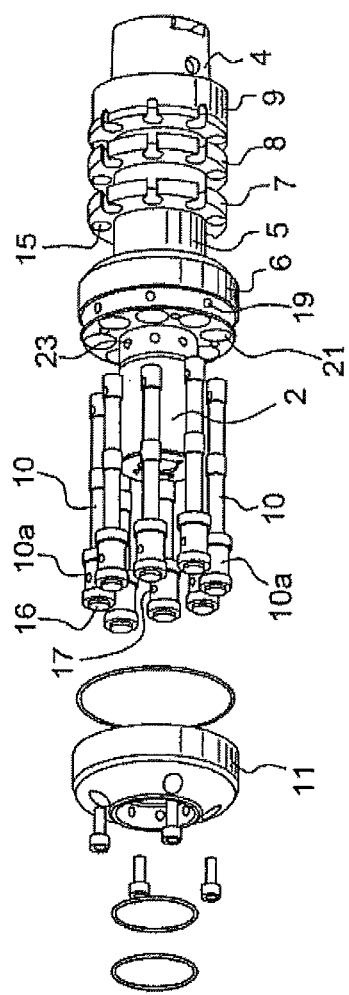
Fig. 2

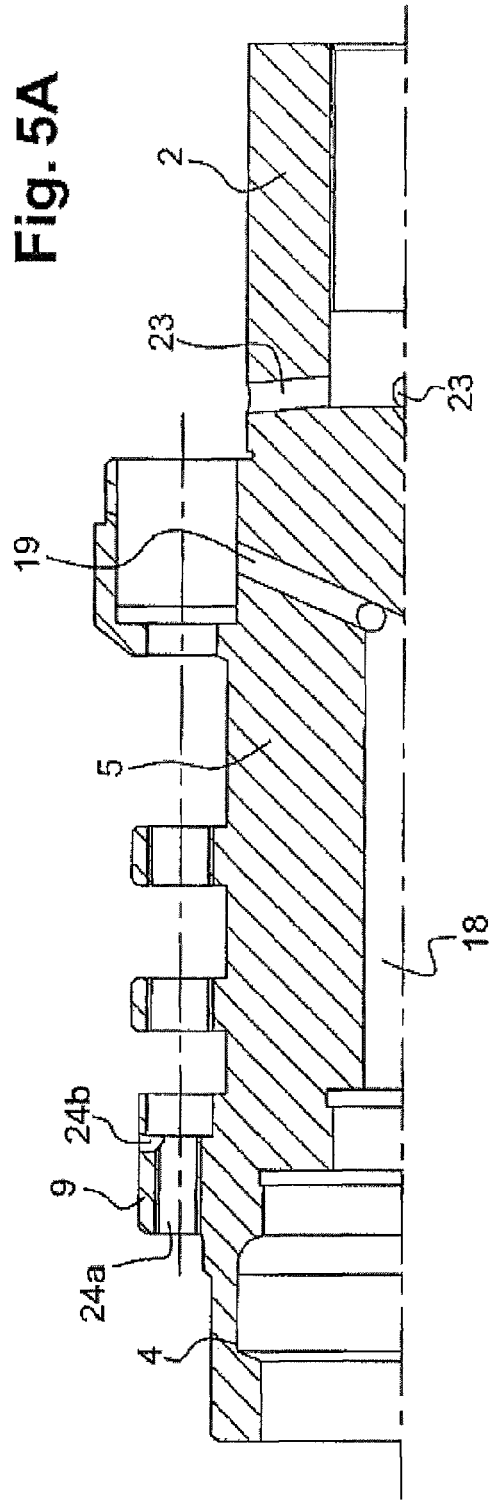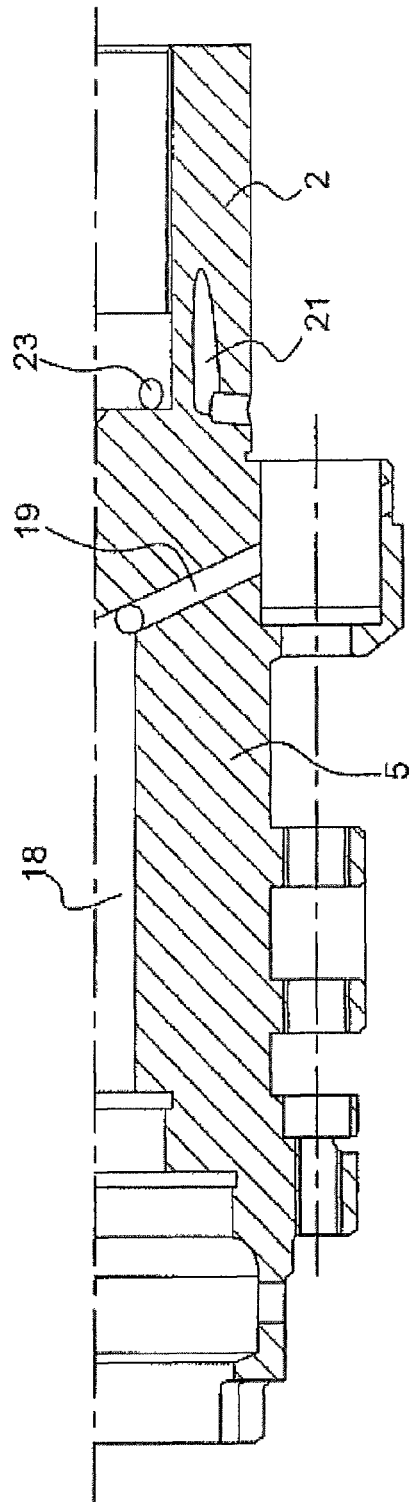

TOOL HOLDER COMPRISING A COOLING MEANS

CROSS-REFERENCE TO RELATED APPLICATIONS

This application is the National Stage of International Application No. PCT/FR2009/051431 International Filing Date, 17 Jul. 2009, which designated the United States of America, and which International Application was published under PCT Article 21 (s) as WO Publication No. WO2010/012933 A2 and which claims priority from, and the benefit of, French Application No. 08 55242 filed on 30 Jul. 2008.

BACKGROUND

The aspects of the disclosed embodiments relate to a tool holder with means of cooling by blowing air.

It is known how to cool tools during their operation by a means engaged in the elements comprising their fastening system to a tool holder.

The cooling must be carried out on the tool so as to reduce the temperatures reached on the tool, that contribute to phenomena damaging the tool under the combined forces resulting from its introduction into the substance, swarf adhering to indentations, and/or lands contributing to the jamming of swarf.

This cooling of the tool must also contribute to a reduction of the temperature of the swarf, which can split up more easily when cool, again contributing to a reduction of the phenomenon of jamming of the swarf.

At the present time, tools are cooled by using an oil, a mixture of oil and air, that may be in the form of a mist of oil, or even by a stream of dry air.

However, for materials with low specific heat and poor heat conductivity, such as composite materials with an organic matrix, or hard metals, steel, or titanium alloys, a stream of dry air is not sufficient to control the temperature levels resulting from tool friction with the materials. It is necessary to reduce the temperature by tens of degrees to perform the operation without damaging the material and under the economically acceptable operating conditions without danger, especially avoiding the risks of inflammability.

The challenge is principally linked to the use of dry machining without lubricant, but it also necessary in general to obtain better resistance to damaging the cutting tools.

To this end, the disclosed embodiments provide for cooling tools on a tool holder by a stream of air, and in particular by a stream of cold air.

SUMMARY

The tool is cooled internally thanks to a flow of air injected through channels normally used by a cooling fluid and through jets of cold air blowing on the outside of the tool.

The cold air is produced by vortex tubes, also called Ranque-Hilsch tubes, which are thermodynamic devices with no moving parts that produce cold air whose origin is described in the document U.S. Pat. No. 1,952,281.

In such a tube, the air injected tangentially into the tube creates an extremely fast vortex flow that is slowed down at a first end of the tube by a conical valve. The heat exchange with the wave produced in return cools the deflected air, which leaves at a second end of the tube.

The vortex tube must be supplied with compressed air at between 5 and 10 bars, and the temperature difference reached is of the order of 70° C. between the entering air and the cold end of the tube, which is completely suitable for use to cool tools.

The disclosed embodiments relate to a tool holder for a machine tool that has means for cooling a tool by a stream of compressed air, characterized in that it comprises a vortex tube compressed air cooling device.

The tool holder preferably has a generally cylindrical shape, with the vortex tube device comprising a plurality of vortex tubes arranged in annular fashion around the axis of the cylinder, whose cold air outlets are pointed toward the tool held by the tool holder.

It advantageously comprises at a first end a nosepiece fitting that can be mounted in place of the tool on the spindle of a machine tool, and at a second end opposite the first end it has a spindle fitting for a tool.

The nosepiece advantageously has a compressed air feed orifice connected to distribution channels in communication with the air inlet(s) of the vortex tube device.

According to a first embodiment, the vortex tube device has air feed tubes opening at the periphery of the tool so as to blow through the tool's indentations.

According to a supplementary or alternative embodiment, the vortex tube device has at least one central air feed tube opening at holes in the tool to blow into the axis of the tool.

According to a particular embodiment, the vortex tube device supplies cold air to a primary circuit of a heat exchanger, with a secondary circuit of the heat exchanger cooling the compressed air before its entry into the channels in the tool.

The disclosed embodiments also relate to a method of machining comprising cooling of a tool, characterized in that the tool is cooled by a stream of air cooled by means of a vortex device positioned on a chuck, between the tool and a spindle of a machine equipped with a supply of compressed air.

According to a first embodiment, the cooled air is blown around the tool.

According to a supplementary or alternative embodiment, the cooled air is blown into a channel in the tool.

BRIEF DESCRIPTION OF THE DRAWINGS

Other characteristics and benefits of the disclosed embodiments will be apparent upon reading the following description of a non-limiting example of embodiment of the disclosed embodiments accompanied by drawings, which show:

FIG. 1: a perspective view of a tool holder pursuant to the disclosed embodiment, FIG. 2: a view of the tool holder of FIG. 1 shown exploded and in perspective, FIGS. 5A and 5B: longitudinal cross sectional half-views of the body of the tool holder of FIG. 1 along offset angles of section;

DETAILED DESCRIPTION

Figure 3:
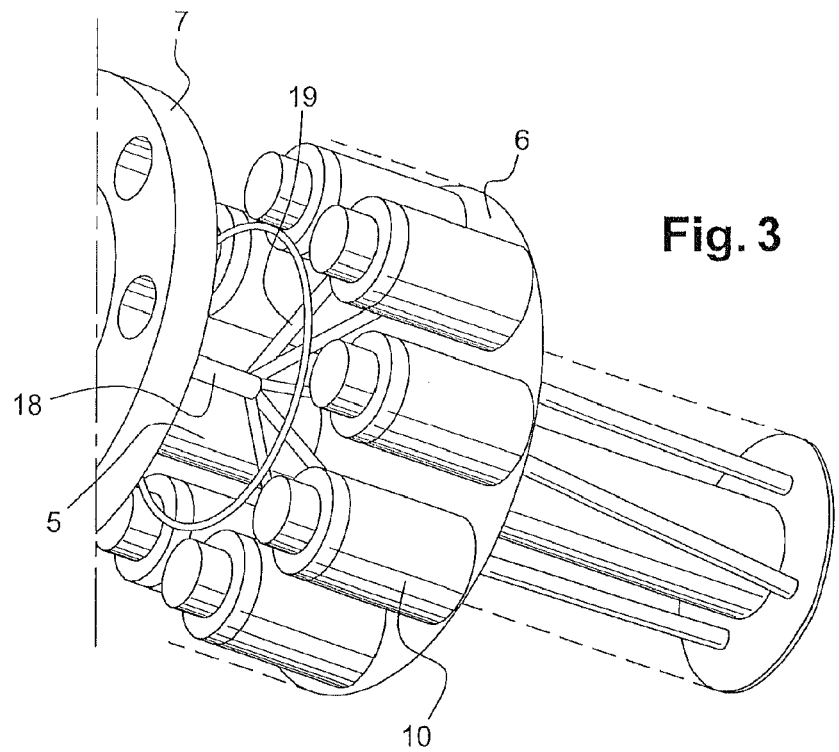
FIG. 3: a transparent detailed view of the tool holder of FIG. 1, FIG. 4: a transparent detailed view of FIG. 3 from another angle.

The disclosed embodiments relate to a tool holder combining the function of cooling by a stream of cold air with a temperature that is variable according to need.

This cooling operates at the tool driven in rotation and/or in translation and is aimed at the tool fitting for the tool holder at the axis of the tool and/or via an external route.

The disclosed embodiments are described here in the context of a drilling tool holder chuck but this principle can be used for cutting tools.

The tool holder 1 shown in FIG. 1 is composed of a chuck that fits on a spindle "B" of known type, for example for an HSK type of attachment according to the standard DIN 69839 or SA of a machine that has a feed conduit for compressed air and for which the compressed air infeed around the tool is accomplished traditionally when fitting the tool on the machine chuck. The tool holder of the disclosed embodiment replaces a traditional tool holder chuck and at a first end it has a nosepiece 4 for mounting on a traditional chuck of a machine tool, and at a second end has a spindle 2 to receive a mounting nosepiece of a tool, with the spindle and the nosepiece having dimensions to permit positioning the tool holder in place of the tool on the machine, and between the two ends it has a central body to hold a vortex tube air cooling device.

The tool holder is shown exploded in FIG. 2.

According to this example, the central body 5 equipped with the nosepiece 4 and the spindle 2 receives eight vortex tubes 10 on its periphery, arranged in a ring around the central body 5.

The vortex tubes are entirely integrated in the tool holder and they are held in grooves 15 in the annular collars 7, 8, 9 of the central body, with the end 10*a* of the vortex tube having the cold outlet 16 and the compressed air inlet 17 being held in a flange 6.

The end of the central body with the spindle 2 holding the tool is given a hood 11 provided with distribution channels for the air cooled by the vortex tubes 10.

The tubes are covered by a cylindrical bonnet 12 on which fits an annular ring 13 covered by an elastomeric sleeve 14.

The nosepiece has a bore 18 for supplying compressed air that extends into the central body as in FIG. 3, seen in transparency, and connected to radial distribution channels 19 made in the flange 6 of the central body in communication with the air inlet(s) of the vortex tube device.

The vortex tubes are arranged so that the air is cooled as close as possible to the tool to avoid reheating this air during its transport in the channels of the chuck.

To simplify the design, the tool side of the chuck is made as a conventional spindle with circulation of lubricating oil, and the air is passed into the lubrication apertures of the tool and around the tool to improve its cooling.

Figure 4:
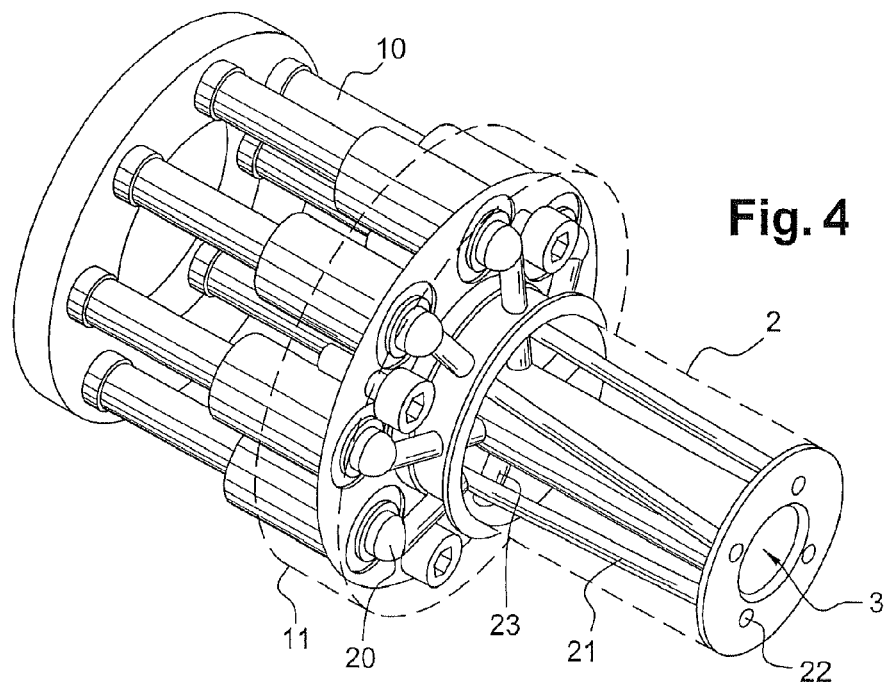

To do this, as shown in FIG. 4, the cold outlets 16 of the tubes are applied against the hood 11 that carries cold air distribution tubes 20 whose outlets are in communication on the one hand with the channels 21 in the spindle 2 provided with outlets 22 around the fitting of the tool in the spindle 2, and on the other hand with channels 23 in the spindle 2 in communication with its central tool-receiving aperture 3.

FIGS. 5A and 5B represent the central body in cross section along two planes angularly offset relative to the longitudinal axis of the central body.

FIG. 5A shows the bore 18 for compressed air feeding the vortex tubes and a channel 19 connecting this bore to the air inlet of a vortex tube.

At the same time, this Figure shows one of the channels 23 connecting the hood 11 to the central bore of the spindle 2 for feeding cold air toward the center of the tool, and the outlet 24 made in the last ring 9 holding the tubes, with a hole 24*b* permitting ambient air to mix with the hot air under pressure leaving the tube to participate in cooling it.

Angularly offset in FIG. 5B can be distinguished a part of a channel 21 feeding the cold air to the end of the spindle 2 to cool the periphery of the tool, through indentations in the tool, for example in the case of a drilling tool.

These last channels are positioned off-axis relative to the axis of the tool holder, to orient the air flow correctly when the tool holder and the tool are in fast rotation.

According to the example shown, four vortex tubes feed four peripheral channels 21 and four vortex tubes feed the interior of the spindle 2.

Figure 6:
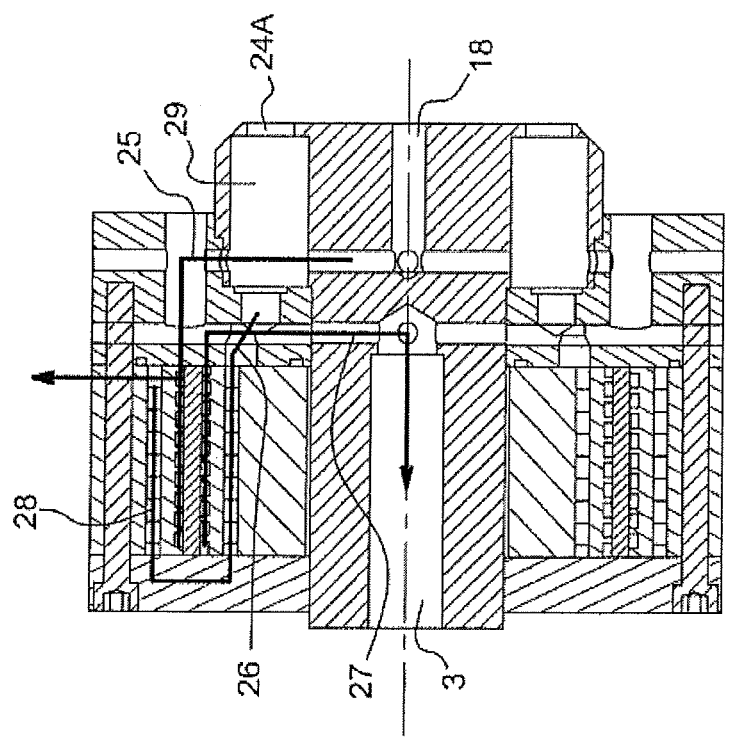
FIG. 6: a cross section of an example of embodiment of the tool holder according to a supplementary embodiment of the disclosed embodiment.

The compressed air for cooling the tool can be cooled by two means:

the tool is supplied directly with the air that leaves the vortex tubes as shown in FIGS. 3 and 4 in particular;

or the tool is supplied at least through a heat exchanger also included as shown in FIG. 6. The vortex tubes then supply the primary circuit of the heat exchanger with cold air, with the secondary circuit cooling the compressed air before its entry into the channels in the tool.

According to this FIG. 6, the inlet of compressed air 18 distributing the vortex tubes arranged in the grooves 29 is also in communication with first channels 25 supplying the compressed air to a heat exchanger 28.

The air passing into the heat exchanger is fed to the center of the tool holder chuck 3 through the second channels 27.

The cold air circuit leaving the vortexes passes through channels 26 to supply the heat exchanger 28 and then escapes to the outside.

In this latter case, the tool accordingly receives cooled compressed air through the secondary circuit at a pressure very close to that of the compressed air system of the shop since not only the fraction of cold air leaving the vortex is used directly, and higher blowing pressure is obtained to the detriment of the output of the cooling device.

Figure 7:
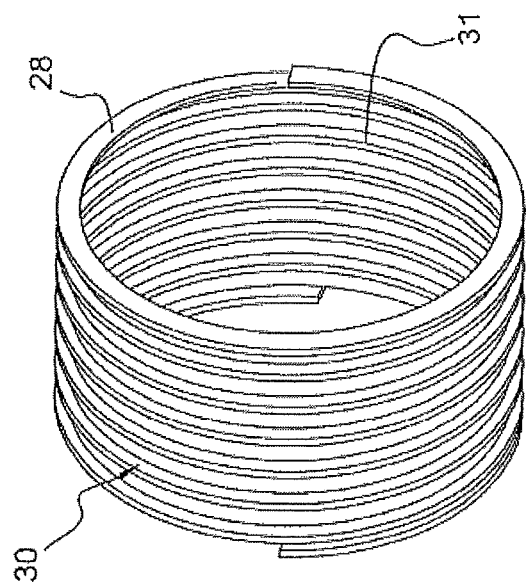
FIG. 7: a detail of embodiment of the tool holder of FIG. 6.

A part of an example of a heat exchanger 28 is shown in FIG. 7.

The heat exchanger here is of annular shape and is composed of a material providing good heat transfer, like copper, for example.

The air circuit coming from the vortexes has a double external helix 30, and the compressed air circuit has a double internal helix 31, so that the air can circulate making a round trip at the heat exchanger.

Heat transfer is effected between the compressed air and the air cooled by the vortex tubes so as to cool the compressed air.

This provides a greater flow rate of cooled air, which increases the cooling power through the interior of the tool channels, compared to using the cold output of the vortex tubes.

The heat exchanger is mounted in place of the hood 11 of FIG. 2, and is concentric with the spindle 2 for hooping the tool.

This last solution can be combined with the solution in which the vortex tubes directly supply the work zone, with the supply channels being divided among angularly spaced radii around the axis of the tool, as in the case of FIGS. 3 and 4, so that the compressed air entering the tool holder is distributed alternately around the circumference of the tool holder into vortex tubes with direct outputs and into the heat exchanger.

During the use of the tool older, the vortex tubes function continuously and provide for cooling, lubricating the tool, and expelling swarf during the machining.

They also provide for lowering the temperature of the tool between two machining operations. The operator does not have to make any particular manipulation during the machining, and neither the machined parts nor the environment are polluted by lubricating fluid.

The principle of the disclosed embodiments permits the realization of a tool holder chuck that cools the environment close to the tool by several tens of degrees.

The disclosed embodiments thus permit:

reducing the temperatures of the tool and of the part around the tool with a view to improve the behavior toward damage to the tool and to the material in which it is turning, reducing the phenomenon of adhesion between the tool and the material in which it is turning, optimizing the speeds of action of the tool in the material, either the rate of increase of the cut depth or the speed of advance, which will have a direct impact on the productivity of the machining, According to the disclosed embodiments, the tool is cooled by a stream of air cooled by means of a vortex device positioned on a chuck between the tool and a spindle of a machine equipped with a supply of compressed air.

The cooled air is preferably blown around the tool and/or into a channel in the tool.

The disclosed embodiments find application for any manufacturing method in which a rotating tool acts on a material, and especially milling and drilling.

The invention claimed is:

1. A tool holder for a cutting machine tool having means for cooling a tool by a stream of compressed air, the tool holder having a generally cylindrical shape with a longitudinal axis and comprising a vortex tube device for cooling compressed air, the vortex tube device comprising a plurality of vortex tubes arranged in a ring around the longitudinal axis of the tool holder, and having cold air outlets pointed toward the tool supported by the tool holder, wherein at least some of the vortex tube device supplies a primary circuit of a heat exchanger with cold air, said heat exchanger having a secondary circuit cooling compressed air before it enters channels in the tool.

2. The tool holder pursuant to claim 1, wherein at least some of the vortex tube device has air feed tubes opening at the periphery of the tool, so as to blow air through indentations in the tool.

3. The tool holder pursuant to claim 1, wherein the vortex tube device has at least one central air feed tube opening at holes in the tool to blow into a longitudinal axis of the tool.

4. The tool holder pursuant to claim 1, comprising at a first end a nosepiece fitting adapted to be mounted in place of the tool on a spindle of the cutting machine tool, and having a tool holder spindle at a second end opposite the first end, and in that the outlets of a first portion of the tubes are in communication with cold air distribution tubes whose outlets are in communication on the one hand with channels of the tool holder spindle, said channels being provided with outlets around the tool fitting in the tool holder spindle, and on the other hand with channels of the tool holder spindle in communication with its central bore for receiving the tool.

5. The tool holder pursuant to claim 1 wherein the heat exchanger has an annular shape.

6. The tool holder pursuant to claim 5 wherein the air circuit from the vortexes has a double external helix, and the compressed air circuit has a double internal helix, with heat transfer being effected between the compressed air and the air cooled by the vortex tubes and cooling the compressed air.

7. The tool holder pursuant to claim 6, wherein the heat exchanger is concentric with the spindle for hooping the tool.

8. The tool holder pursuant to claim 1, wherein some of the vortex tubes directly supply the work zone, with the supply channels being divided among angularly spaced radii around the axis of the tool, so that the compressed air entering the tool holder is distributed alternately around the circumference of the tool holder into vortex tubes with direct outputs and into the heat exchanger.

9. The tool holder pursuant to claim 1, wherein the tool holder includes a nosepiece that has a bore for supplying compressed air that extends into the central body of the tool holder, and is connected to radial distribution channels made in a flange of the central body in communication with the air inlet(s) of the vortex tube device, in that the vortex tubes are entirely integrated in the tool holder, and in that the end of the central body with the spindle holding the tool is given a hood provided with distribution channels for the air cooled by the vortex tubes.

* * * * *